Nov. 18, 1958  R. H. DAVIES  2,860,651
APPARATUS FOR CONTROLLING THE EMPTYING OF TANKS
Filed Jan. 24, 1955  3 Sheets-Sheet 1

INVENTOR.
ROBERT H. DAVIES
BY
ATTORNEYS

Nov. 18, 1958  R. H. DAVIES  2,860,651
APPARATUS FOR CONTROLLING THE EMPTYING OF TANKS
Filed Jan. 24, 1955  3 Sheets-Sheet 2

INVENTOR.
ROBERT H. DAVIES
BY
ATTORNEYS

# 2,860,651

APPARATUS FOR CONTROLLING THE EMPTYING OF TANKS

Robert H. Davies, Aurora, Ohio, assignor to Parker-Hannifin Corporation, a corporation of Ohio Application January 24, 1955, Serial No. 483,646

10 Claims. (Cl. 137—98)

This invention relates to an apparatus for controlling the emptying of liquid from tanks and more particularly to an apparatus for controlling the relative rate at which a pair of tanks empty. The invention has particular use in aircraft where it is essential that fuel tanks at different locations empty at a predetermined relative rate in order to avoid or minimize a shift in the center of gravity of the airplane as the fuel is being consumed.

It is an object of the invention to provide an apparatus for controlling the emptying of a pair of tanks whereby a predetermined relationship of the liquid heads in the two tanks will be maintained as the tanks empty.

It is another object to provide an apparatus in connection with a pair of tanks whereby a difference in the two tank heads, greater or less than a predetermined amount, is utilized for initiating and controlling operation of a means for restoring the predetermined head differential.

It is another object to provide a means for controlling the emptying of a pair of tanks where in the liquid being emptied from the tanks is utilized for operating a device which regulates the rate at which one of the tanks empties, and wherein utilization of the liquid for this purpose is controlled by the difference in the liquid heads in the two tanks.

Another object is to provide a differential pressure device to be used in connection with the emptying of a pair of tanks wherein the device includes a valve connected to a pair of diaphragms each subject to the head pressure within a respective tank and acting in opposition to each other whereby the valve will be positioned according to the difference in the head pressures applied to the diaphragms.

It is another object to provide a means for controlling the emptying of liquid from a pair of tanks wherein there is a valve unit associated with each tank for regulating the emptying of the respective tank and wherein these units are under the control of a differential pressure device sensitive to the difference in liquid heads within the tanks.

Other objects will become apparent from a description of the invention and from the drawings in which.

Figure 1:
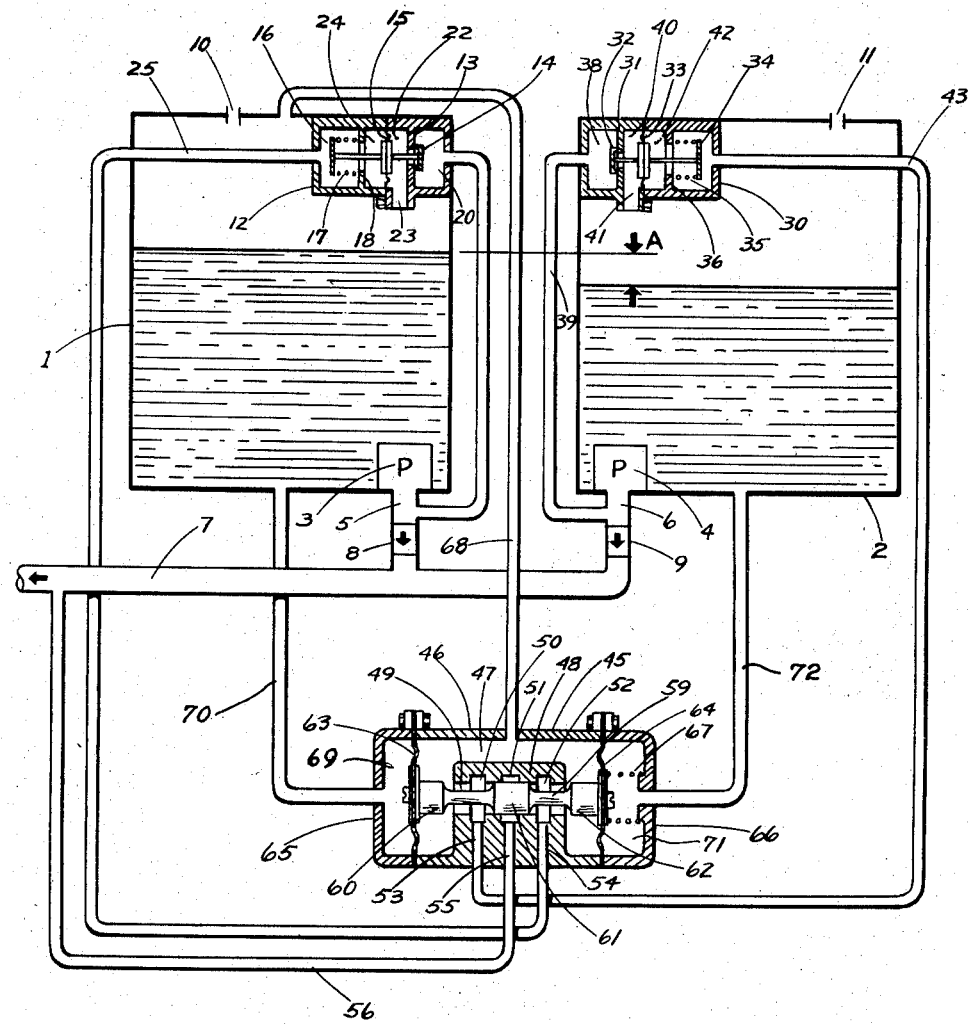
Figure 1 is a sectional view of the device showing the position of the parts when the tanks are emptying and there is a predetermined difference in the liquid heads within the two tanks.

Referring to Figure 1, tanks 1 and 2 are each preferably provided with pumps 3 and 4, respectively. Pump 3 is connected to a conduit 5 and pump 4 is connected to a conduit 6, both of these conduits being connected to a common discharge pipe 7. Check valves 8 and 9 of conventional design prevent back flow from the pipe 7 to the conduits 5 and 6. Vent outlets 10 and 11 permit air to enter the respective tanks as the latter are being emptied, and these vent outlets may be valved in any well known manner.

Mounted at the upper end of the tank 1 is a valve unit 12 having a valve seat 13 and a movable valve head 14 for cooperation with the seat 13. The valve member 14 is connected to a flexible diaphragm 15 and the latter is connected to an abutment member 16. A spring 17 bears against the abutment member 16 and a shoulder 18 of the valve casing to normally urge the valve member 14 to closed position on the seat 13.

A chamber 20 on one side of the valve seat 13 communicates with a pipe 21 which is connected to the conduit 5. A chamber 22 on the other side of the valve seat 13 communicates with the interior of the tank 1 through a port opening 23 and is separated from a chamber 24 by the diaphragm 15. Chamber 24 communicates with a pipe 25.

Likewise, tank 2 has a valve unit 30 mounted at its upper end. The valve 30 includes a valve seat 31 and a movable valve member 32. The valve member 32 is connected to a diaphragm 33 and the latter is connected to an abutment member 34. A spring 35 is interposed between the abutment member 34 and a shoulder 36 in the valve casing and is normally effective for keeping the valve member 32 closed against the seat 31.

A chamber 38 on one side of the seat 31 is in communication with a pipe 39 which in turn is connected to conduit 6. A chamber 40 on the other side of the seat 31 communicates with the interior of tank 2 through a port opening 41 and is separated from another chamber 42 by the diaphragm 33. The chamber 42 communicates with a pipe 43.

Connected to both tanks is a differential pressure device 45. This device includes a central casing section 46 having a chamber 47. Extending into the chamber 47 is a casing portion 48 having a valve bore 49 therethru. Surrounding the valve bore 49 at spaced points are annular undercuts 50, 51, and 52.

The undercut 50 communicates through a port 53 with the pipe 43 and the undercut 52 communicates through a port 54 with the pipe 25. A central undercut 51 communicates through a port 55 with a pipe 56 which in turn is connected to the discharge pipe 7.

Mounted within the bore 49 is a removable valve member 59 having sealing lands 60, 61, and 62. A flexible diaphragm 63 is secured to one end of the valve member 59 and another flexible diaphragm 64 is secured to the other end. The outer margins of both diaphragms are clamped to the casing member 46 by caps 65 and 66. A spring 67 is interposed between the cap 66 and the diaphragm 64.

Diaphragm 63 and cap 65 form a pressure chamber 69 which is connected to the bottom of tank 1 by a pipe 70. Likewise diaphragm 64 and cap 66 form a pressure chamber 71 which is connected to the bottom of tank 2 by a pipe 72.

A vent pipe 68 connects the chamber 47 to the interior of tank 1 at the top of the latter.

In operation, as in an aircraft, the pumps 3 and 4 are operated simultaneously so that fuel is delivered from both tanks 1 and 2 to the conduit 7 for delivery to the engines. If tanks 1 and 2 are on opposite sides of the center of gravity of the aircraft, it will be desirable to empty both tanks at approximately the same rate so that the reduction of weight on each side of the center of gravity is uniform and hence there will be no change in the position of the center of gravity due to the consumption of fuel from the two tanks.

In some instances, as when one tank is spaced farther from the center of gravity than the other, it may be desirable to have a larger amount of fuel in one tank than in the other. In such cases the desired difference in the quantity of fuel in each tank results in a difference in fuel heads as represented at A in Figure 1. It is then desirable to maintain this difference in heads as the two tanks empty.

To achieve this, the two tanks may be mounted at correspondingly different heights within the aircraft, or if mounted at the same level, the spring 67 is provided. If mounted at the same level but the head in tank 2 is to be less than the head in tank 1 by the amount A, spring 67 is interposed between diaphragm 64 and cap 66 and is so selected that it transmits a force to diaphragm 64 equivalent to that which would be provided by a fuel head equal to the desired difference A.

If it is desired to reverse the relationship so that the head in tank 2 is maintained greater than that in tank 1, the spring 67 is interposed between the cap 65 and the diaphragm 63.

When the tanks are mounted at the same level, the various parts of the device will be in the position as shown in Figure 1 as long as the predetermined head differential A is being maintained. In this position, the valves 14 and 32 are normally maintained closed by the springs 17 and 35, respectively, and also by back pressure of fluid in pipes 21 and 39.

Since the force from the liquid head in tank 1 and line 70 is equal to that of the liquid head in tank 2 and line 72 plus the spring 67, the forces applied to the outer sides of diaphragms 63 and 64 are equal and the diaphragms maintain the valve member 59 in a central position wherein land 61 overlies both sides of the annular undercut 51 to block fuel pressure transmitted from the pipe 7 through the pipe 56 to valve port 55.

Figure 2:
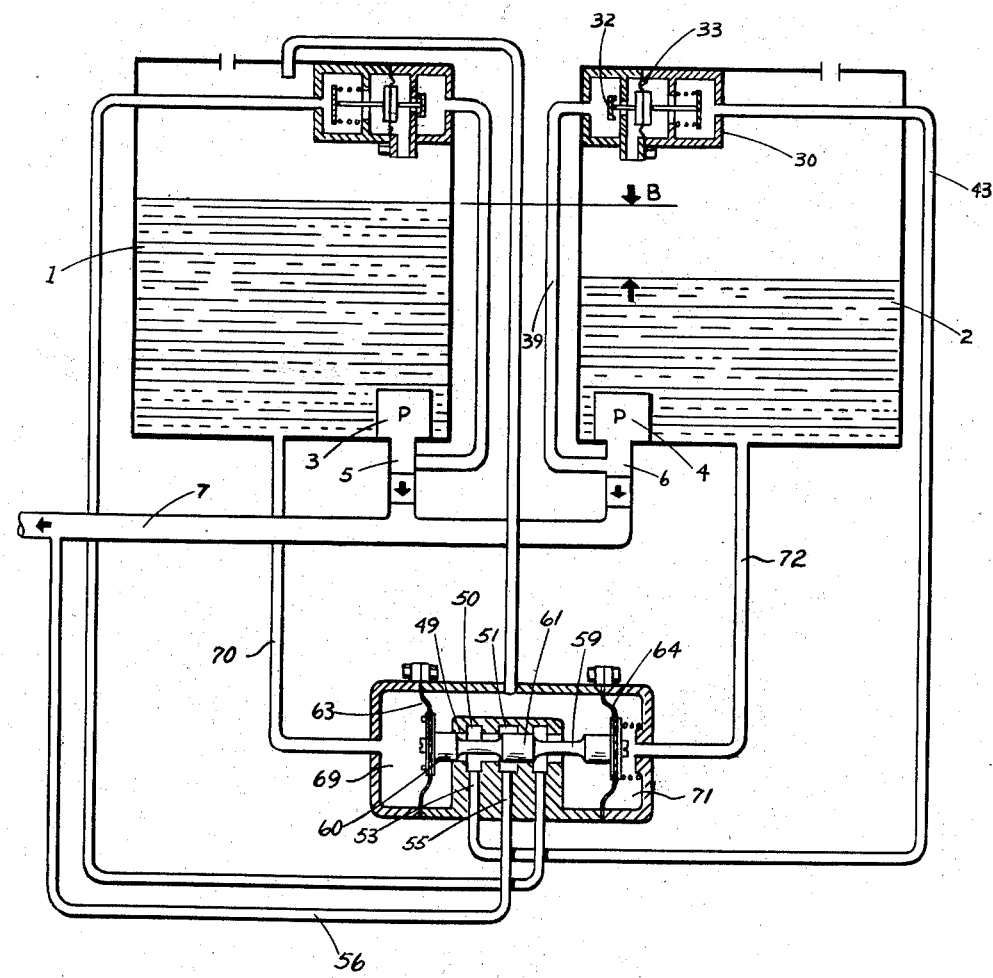
Figure 2 is a sectional view showing the parts when the difference in liquid heads within the two tanks is greater than a predetermined amount.

If tank 2 starts to empty more rapidly than tank 1, the head differential between the two tanks will become greater than the predetermined amount A and reach some value B. When this occurs, the relatively greater head in tank 1 will exert a greater force to the diaphragm 63 than the spring 67 and head from tank 2 will exert on diaphragm 64, causing the diaphragms and valve 59 to move to the positon shown in Figure 2.

In this position the land 60 closes the adjacent end of the valve bore 49 and the land 61 uncovers one side of the undercut 51 to permit fluid under pressure from the conduit 7, pipe 56 and port 55 to pass into the valve bore, the undercut 50, and out the port 53 and pipe 43 to the valve 30. This fluid then acts on the diaphragm 33 to unseat the valve 32. This permits some of the fuel being discharged from tank 2 by pump 4 into conduit 6 to recirculate through the pipe 39 back into tank 2 and thus effectively to decrease the rate at which tank 2 is being emptied. Meanwhile, tank 1 continues to empty into conduit 5 and delivery pipe 7 at its normal rate.

Recirculation of some of the fluid from tank 2 through pipe 39 back into the tank continues until the head differential B is reduced to the predetermined amount A. When this occurs, the forces on the diaphragm 63 and 64 will again be equalized and the valve member 59 will be shifted to the closed position as shown in Figure 1. This cuts off the pressure in pipe 43 and permits the valve 32 to close to discontinue recirculation of fuel through the pipe 39.

Figure 3:
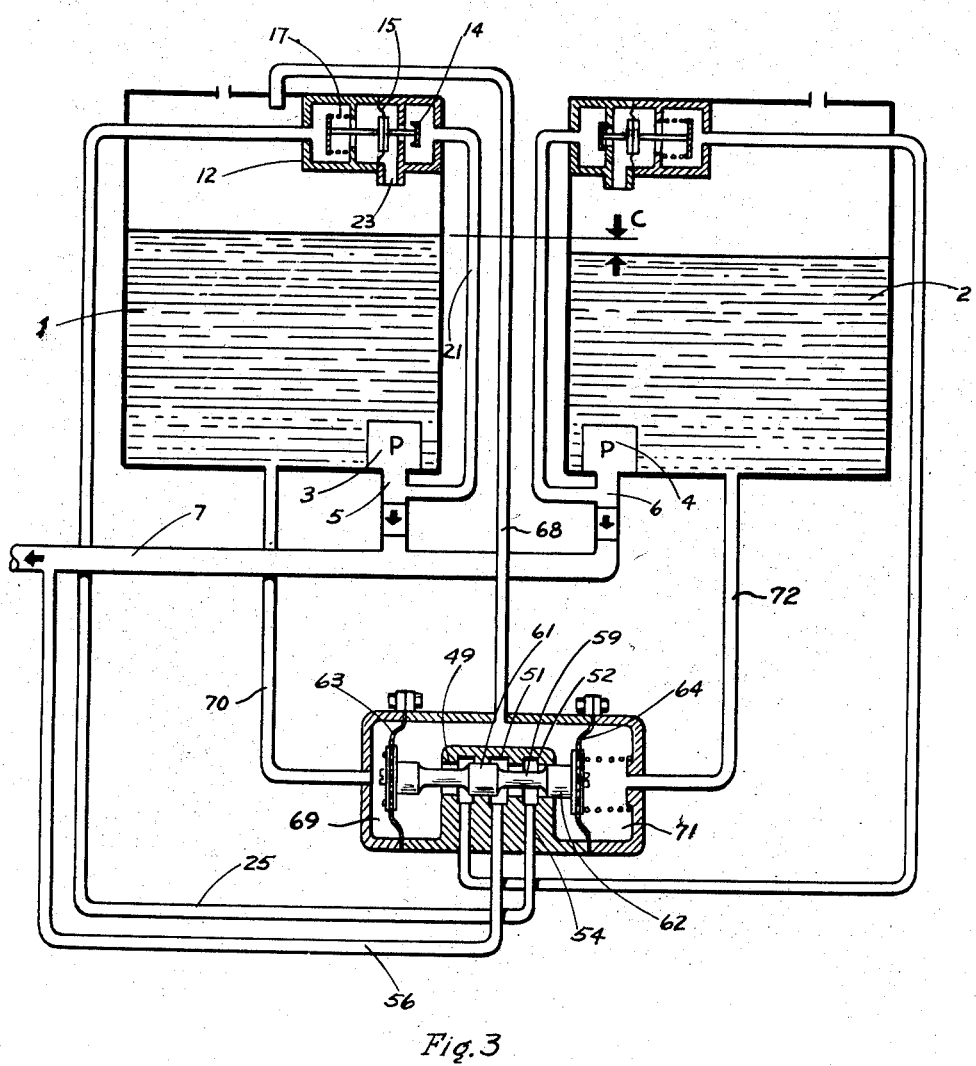
Figure 3 is a sectional view showing the parts when the difference in liquid heads within the two tanks is less than a predetermined amount.

In the event fuel has emptied from tank 1 at a faster rate than from tank 2, the head differential will be reduced to some value C. This will cause the force on diaphragm 64 to become relatively larger than that on diaphragm 63 and the valve 59 will shift to the position shown in Figure 3. In this position the land 62 blocks the adjacent end of the valve bore 49 and the land 61 opens one side of the undercut 51 to the undercut 52. This permits pressure fluid from conduit 7 and pipe 56 to enter port 54, pipe 25, and valve 12 to act on the diaphragm 15 to unseat the valve 14. This causes fluid from conduit 5 to circulate back through the pipe 21 past the valve 14 and through the opening 23 into the tank 1 to effectively decrease the rate at which tank 1 is emptying into conduit 7.

As soon as the head differential C is increased to the predetermined value A, the forces on diaphragms 63 and 64 will again be equalized to shift the valve 59 to its central position for cutting off pressure fluid from undercut 52. This drops the pressure in pipe 25 and permits the spring 17 to reseat the valve 14.

The vent pipe 68 connects the chamber 47 to the interior of one of the tanks where the vent pressure is lower than the pressures acting on the outer sides of the diaphragms 63 and 64. This provides a means for subjecting the inner sides of both diaphragms 63 and 64 to a common reference pressure and assures that the same force is acting on the inner sides of both diaphragms to oppose the forces acting on the outer sides of the diaphragms. Hence the two diaphragms, being connected by means of the valve 59 will be directly responsive to any difference in forces on the outer sides of the diaphragms. The vent pipe 68 also serves as a return for any fuel that may leak past the valve 59 into chamber 47.

Having described one embodiment of my invention, it is understood that various changes in the details may be made. I do not wish to be limited to the specific details shown and described herein but my invention embodies the full scope of the appended claims.

I claim:

1. Apparatus for controlling the emptying of liquid from tanks, comprising, in combination, first and second tanks each containing liquid, each tank having a discharge pipe through which it may be emptied, a return conduit extending from one of the discharge pipes back to the interior of its respective tank, a differential pressure control device including first and second movable elements, means operatively connected with the first tank and the first element for transmitting the head pressure from the first tank to the first element to urge said first element in one direction, means operatively connected with the second tank and the second element for transmitting the head pressure from the second tank to the second element to urge said second element in an opposite direction, a source of power fluid, means including a pressure operated valve in said return conduit and operatively connected to said control device, said control device also including a pilot valve acted upon by said elements and positionable by the difference in force developed on the two elements by said head pressures for controlling the flow of power fluid to said pressure operated valve.

2. Apparatus in accordance with claim 1 wherein a spring acts on one of the diaphragms to augment the head pressure acting thereon.

3. Apparatus for controlling the emptying of liquid from tanks, comprising, in combination, first and second tanks each containing liquid, each tank having a discharge pipe through which it may be emptied, a return conduit extending from one of the discharge pipes back to the interior of its respective tank, a differential pressure control device including first and second movable diaphragms, means operatively connected with the first tank and the first diaphragm for transmitting the head pressure from the first tank to one side of the first diaphragm to urge said first diaphragm in one direction, means operatively connected with the second tank and the second diaphragm for transmitting the head pressure from the second tank to one side of the second diaphragm to urge said second diaphragm in the opposite direction, the other side of each diaphragm being subject to a common reference pressure, a valve acted upon in opposite directions by said diaphragms and positionable by the difference in the net unbalanced force developed on the two diaphragms, said control device also including means responsive to the position of said valve for regulating the flow of liquid through said return conduit.

4. Apparatus for controlling the emptying of tanks, comprising, in combination, first and second tanks each containing liquid, a discharge conduit leading from each tank, a pump associated with each tank for emptying the same through the respective discharge conduit, a bypass conduit connecting each discharge conduit downstream of the respective pump to the respective tank, a fluid pressure operated valve in each bypass passage, a differential pressure device having a movable valve element provided with opposed surfaces, means for transmitting the liquid head pressure in each tank to the opposed surfaces of the differential pressure device, a source of power fluid, said movable valve element of the differential pressure device being responsive to the head pressures transmitted thereto and shiftable to direct power fluid to said valves to open or close the bypass conduits.

5. Apparatus in accordance with claim 4 wherein there is a means for utilizing a portion of the liquid discharged from the tanks as the power fluid.

6. Apparatus in accordance with claim 4 wherein the discharge conduits from each tank are connected to a common delivery conduit and there is a check valve in each discharge conduit between the respective bypass connection and the common delivery conduit to prevent interflow of liquid between the tanks.

7. Apparatus for controlling the rate of emptying of liquid from tanks, comprising, in combination: a pair of tanks each adapted to contain a liquid, a discharge pipe connected to each of the tanks through which emptying of each tank may occur, means including a return conduit for bypassing fluid from at least one discharge pipe back into its respective tank, a valve in said return conduit, a differential pressure device and having a movable valve element connected to actuate said valve, the movable element having opposed surfaces, and means for transmitting the head pressure of the liquid in each tank to the opposed surfaces of said differential pressure device, whereby an increase in liquid head pressure in one of the tanks relative to the other is effective to open the valve and bypass liquid back into said other tank through said return conduit.

8. Apparatus for controlling the rate of emptying of liquid from tanks, comprising, in combination: a pair of tanks each adapted to contain a liquid, discharge means connected to each of the tanks through which emptying of each tank may occur, means including a return conduit for bypassing fluid from each discharge means back into its respective tank, a valve in each return conduit, a differential pressure device and having a movable valve element connected to actuate each of said valves, the movable element having opposed surfaces, and means for transmitting the head pressure of the liquid in each tank to said opposed surfaces of the differential pressure device, whereby an increase in liquid head pressure in one of the tanks relative to the other is effective to open the valves and bypass liquid back into said other tank.

9. Apparatus for controlling the rate of emptying of liquid from tanks, comprising, in combination: a pair of tanks each adapted to contain a liquid, discharge means including a pump connected to each of the tanks through which emptying of each tank may occur, means including a return conduit for bypassing fluid from each discharge means downstream from the pump back into its respective tank, a valve in each return conduit, a differential pressure device having a movable element connected to actuate each of said valves, the movable element having opposed surfaces, and conduit means for transmitting the head pressure of the liquid in each tank to said opposed surfaces of the differential pressure device, whereby an increase in liquid head pressure in one of the tanks relative to the other is effective to bypass liquid back into said other tank.

10. Apparatus for controlling the rate of discharge of liquid from tanks, comprising in combination: a pair of tanks, a pair of discharge pipes, one connected to each tank, a pump in each discharge pipe, a return conduit connected to each discharge pipe downstream from the pump and extending back to its respective tank, a valve in each return conduit, a differential pressure device having a movable element connected to actuate each of said valves, the movable element having opposed surfaces, and conduit means for transmitting the head pressure of the liquid in each tank to the opposed surfaces of said differential pressure device, whereby an increase in liquid head pressure in one of the tanks relative to the other is effective to bypass liquid back through the return conduit connected to the other tank.

References Cited in the file of this patent

UNITED STATES PATENTS

| | | |
|---|---|---|
| 1,237,980 | Webster | Aug. 21, 1917 |
| 2,313,822 | Hapgood | Mar. 16, 1943 |
| 2,394,431 | Curtis et al. | Feb. 5, 1946 |
| 2,459,527 | Herbert | Jan. 18, 1949 |
| 2,459,807 | Gavin et al. | Jan. 25, 1949 |
| 2,478,671 | Smith | Aug. 9, 1949 |
| 2,509,629 | De Giers et al. | May 30, 1950 |
| 2,601,990 | Holzer | July 1, 1952 |
| 2,617,477 | Isreeli | Nov. 11, 1952 |
| 2,726,671 | Zand et al. | Dec. 13, 1955 |
| 2,759,424 | Defibaugh et al. | Aug. 21, 1956 |